United States Patent [19]
Komdeur et al.

[11] Patent Number: 6,042,358
[45] Date of Patent: Mar. 28, 2000

[54] MACHINE FOR MAKING BALLS OF BUTTER

[75] Inventors: Kasper Komdeur, Jenison; Richard C. Smith, Rockford, both of Mich.

[73] Assignee: Butterballs Farms, Inc., Grand Rapids, Mich.

[21] Appl. No.: 09/024,721

[22] Filed: Feb. 17, 1998

[51] Int. Cl.[7] .......................... B29C 69/02; A23C 15/00
[52] U.S. Cl. .................. 425/313; 425/311; 425/332; 425/364 R; 426/516; 426/518; 83/16; 83/169
[58] Field of Search ..................... 425/332, 333, 425/364 R, 311, 312, 313, 464; 426/516, 518; 83/610, 599, 597, 169, 171, 16; 264/142, 148

[56] References Cited

U.S. PATENT DOCUMENTS

| | | | |
|---|---|---|---|
| Re. 9,151 | 4/1880 | Vale | 425/311 |
| 209,365 | 10/1878 | Smith | 425/311 |
| 817,352 | 4/1906 | Walstead | 425/311 |
| 1,126,606 | 1/1915 | Wolf | 425/364 R |
| 1,303,013 | 5/1919 | Bainbridge | 425/332 |
| 2,035,188 | 3/1936 | Quick | 425/364 R |
| 2,293,109 | 8/1942 | Bridge | 425/364 R |
| 2,739,545 | 3/1956 | Nelson | 426/516 |
| 3,776,671 | 12/1973 | Bruschke et al. | 425/311 |
| 4,008,720 | 2/1977 | Brinchmann et al. | 83/169 |
| 4,191,519 | 3/1980 | Benier | 425/332 |
| 4,442,131 | 4/1984 | Nagy et al. | 425/311 |
| 5,143,735 | 9/1992 | Varvello et al. | 425/364 R |
| 5,277,569 | 1/1994 | Anetsberger | 425/332 |
| 5,356,652 | 10/1994 | Campbell | 425/311 |
| 5,538,414 | 7/1996 | Kobayashi et al. | 425/364 R |
| 5,772,718 | 6/1998 | Flynn | 83/16 |

*Primary Examiner*—Robert Davis
*Assistant Examiner*—Thukhanh Nguyen

[57] ABSTRACT

An apparatus for making balls of butter includes a conveyor and a dispensing head mounted above the conveyor for delivering pieces of butter to the conveyor. Two roller bar assemblies are mounted above the conveyor, and crank arms rotate each of the roller bar assemblies in a plane which extends generally parallel to the conveyor. As the butter pieces are moved by the conveyor past the roller bar assemblies, the roller bars roll the butter on the conveyor and form the butter into balls. The balls of butter may be delivered to a freeze tunnel for freezing before packaging.

13 Claims, 5 Drawing Sheets

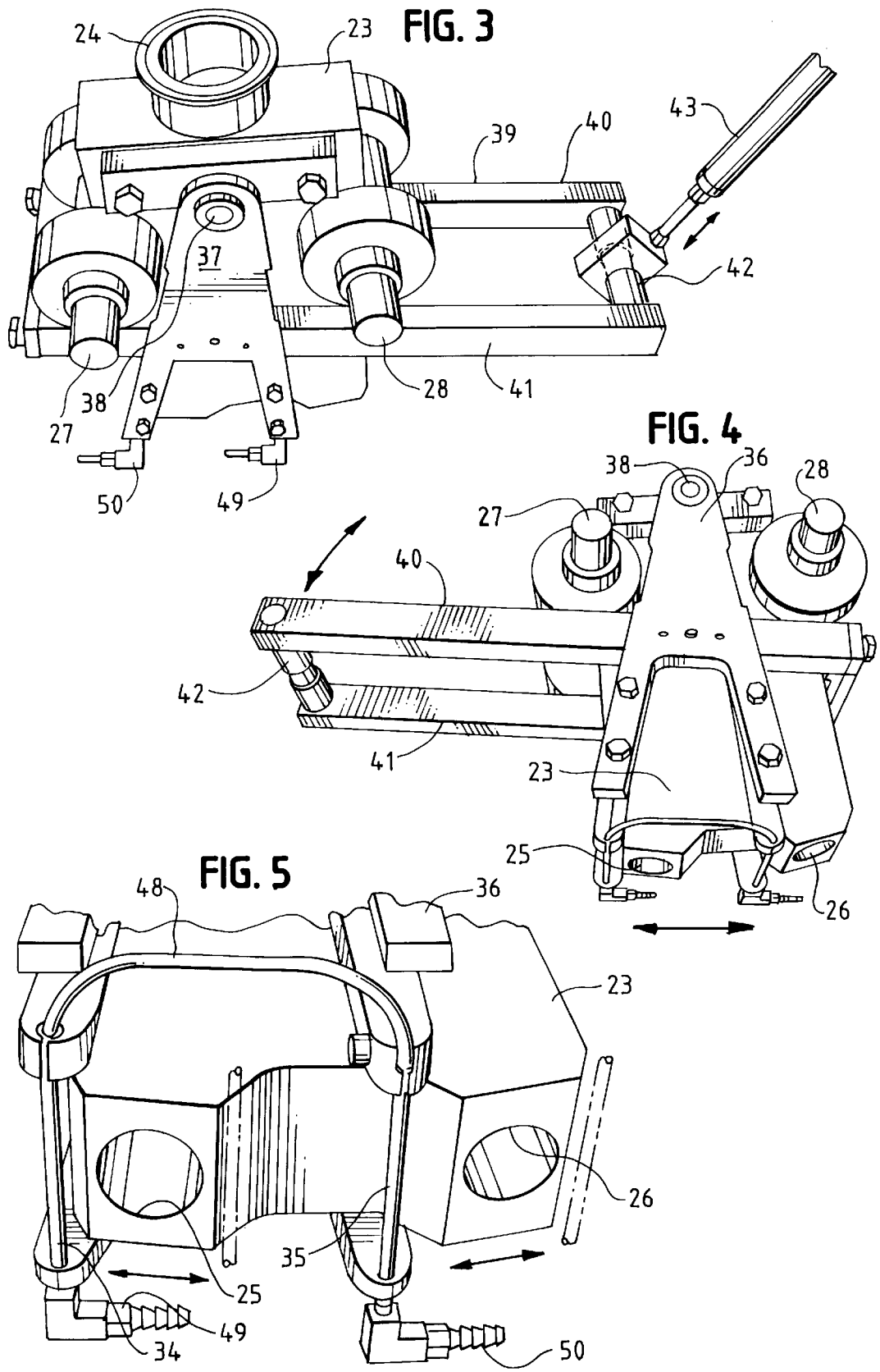

MACHINE FOR MAKING BALLS OF BUTTER

BACKGROUND

This invention relates to a machine for automatically making balls of butter.

Balls of butter of individual serving size have long been made manually. For example, one method uses a pair of handheld paddles. Each paddle has a textured, ribbed, or grooved surface. A piece of butter is positioned between the paddles, and the paddles are rotated in opposite directions to form the butter into a ball which has a textured surface which matches the textured surface of the paddles.

Manually forming balls of butter is time-consuming, and production of commercial-sized quantities is expensive. However, to our knowledge, an apparatus for automatically making balls of butter has not heretofore been available.

SUMMARY OF THE INVENTION

The invention automatically shapes pieces of butter into ball shapes. Butter is extruded through a dispensing head, and a water heated cutting bar cuts the butter into pieces which drop onto a conveyor. A pair of elongated roller bars are mounted above the conveyor, and crank arms rotate the ends of each roller bar so that the butter pieces are rolled into balls between the roller bars and the conveyor. The surface of the conveyor and each of the roller bars is textured or grooved to provide each ball with a textured surface. The conveyor feeds the balls into a freezer tunnel where the balls are transferred to a second conveyor. The second conveyor delivers frozen balls at the opposite end of the tunnel where the balls are packaged.

DESCRIPTION OF THE DRAWING

The invention will be explained in conjunction with an illustrative embodiment shown in the accompanying drawing, in which

FIG. 3 is a fragmentary top perspective view of the dispensing head;

FIG. 4 is a bottom perspective view of the dispensing head;

FIG. 5 is an enlarged fragmentary bottom perspective view of the dispensing head;

DESCRIPTION OF SPECIFIC EMBODIMENT

Figure 1:
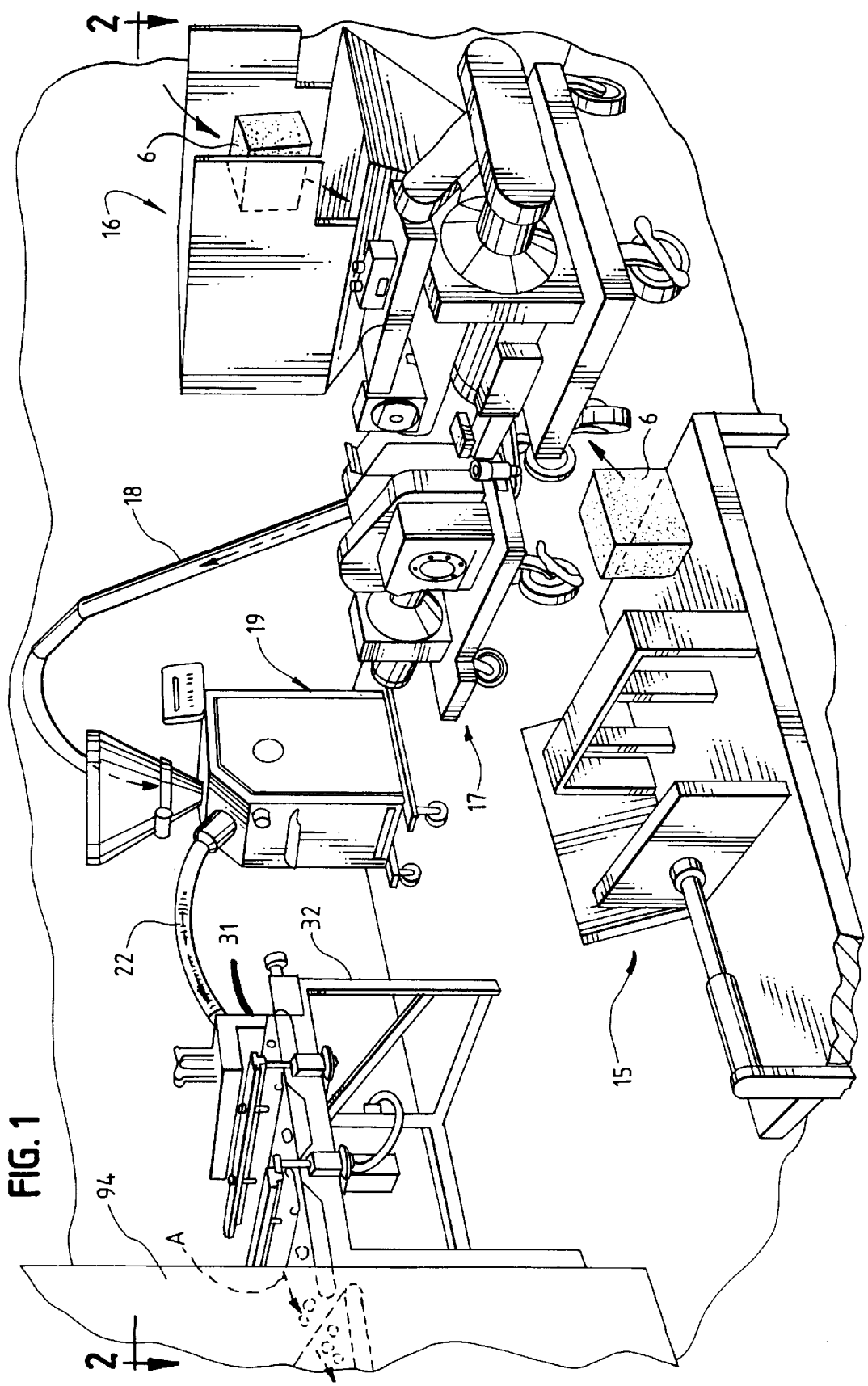
FIG. 1 is a fragmentary perspective view of an apparatus formed in accordance with the invention.
Figure 2:
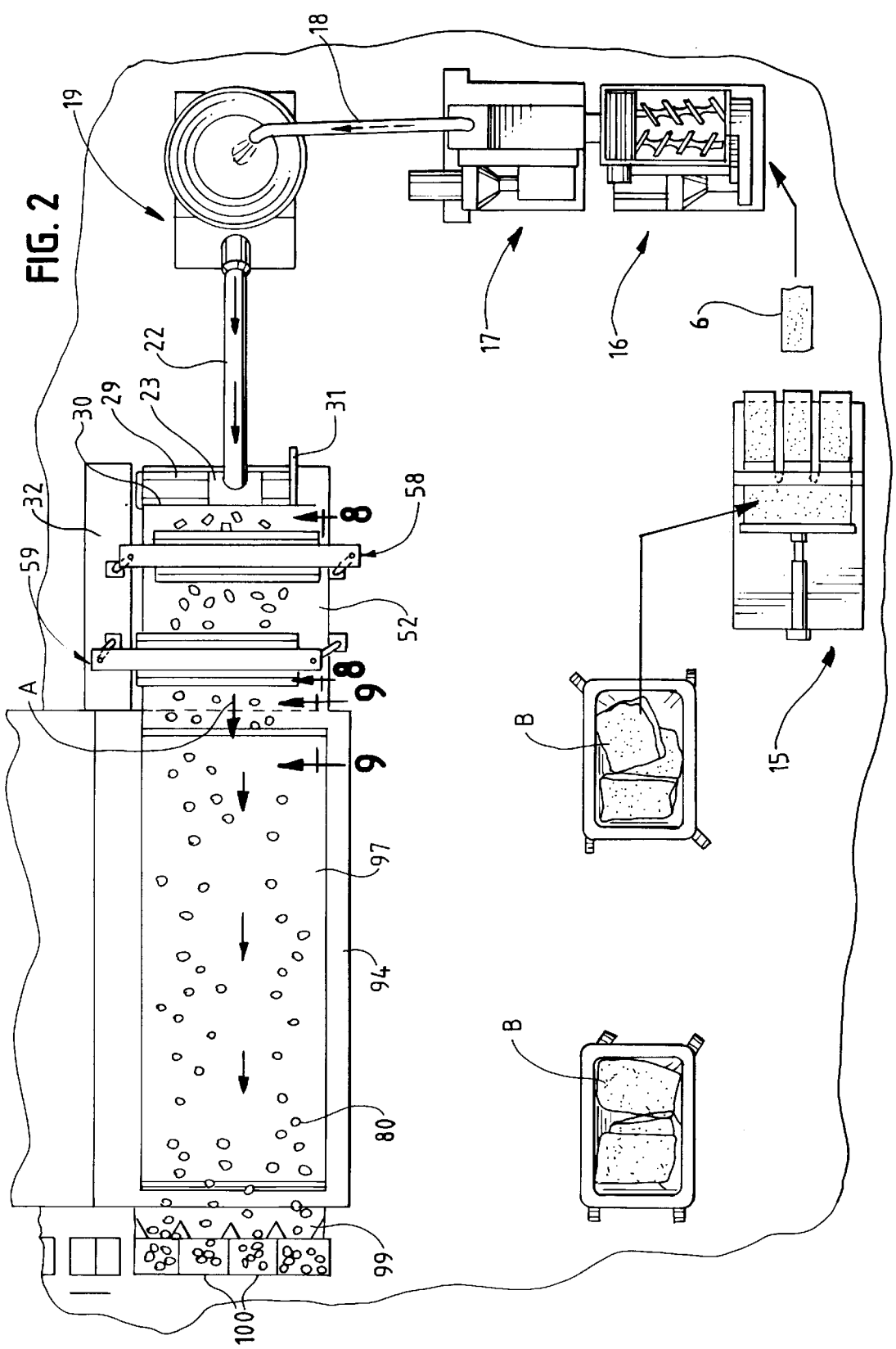
FIG. 2 is a fragmentary top plan view, partially in section, as would be seen along the line 2—2 of FIG. 1.

Referring to FIGS. 1 and 2, a butter block splitter 15 splits large blocks B of butter into smaller blocks b which are transported to a butter microfixer 16. The particular butter microfixer illustrated is made by H. Doering & Sons.

The butter is pumped from the butter microfixer by a pump 17 through a flexible pipe 18 to a Vemag Model 500 vacuum extruder 19. The pump may be a 134 Waukasha p.d. pump. The Vemag vacuum extruder is designed for making meatballs and is available from Vemag Maschinen und AnLagen bau GMbH of Verden, Germany. The extruder includes a Vemag portioning computer PC 878.

The Vemag extruder forces butter through a flexible pipe 22 to a butter dispensing head 23. Referring to FIGS. 3–5, the dispensing head 23 is formed from a block of stainless steel and includes an inlet opening 24 which is connected to the pipe 22 and a pair of outlet openings 25 and 26. A Y-shaped internal passage connects the inlet opening to the two outlet openings. For best overall results, the temperature of the butter should be about 43° to 45° F.

Figure 6:
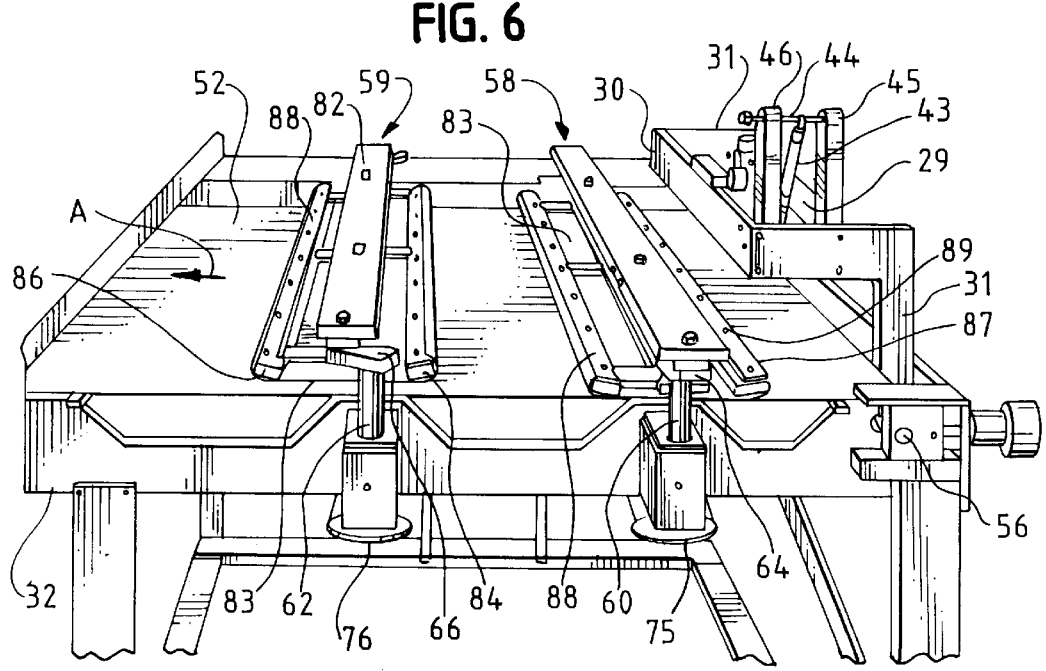
FIG. 6 is a fragmentary perspective view of one side of the conveyor and the roller bars.

A pair of mounting pins 27 and 28 are attached to the dispensing head and support the dispensing head between a pair of spaced-apart rails 29 and 30 (FIGS. 2 and 6). The rails are supported by a pair of L-shaped end brackets 31 which extend upwardly from a conveyor table or frame 32.

Referring again to FIGS. 3–5, a pair of cutting bars 34 and 35 are reciprocably mounted below the outlet openings 25 and 26 of the dispensing head. The cutting bars are mounted on a pair of pivot arms 36 and 37 which are rotatably mounted on opposite sides of the dispensing head by pins 38. A rectangular actuating frame 39 includes a pair of elongated bars 40 and 41 which straddle the dispensing head and which are connected to the pivot arms 36 and 37. A rod 42 extends between the ends of the bars 40 and 41 and is connected to a double-acting pneumatic cylinder and piston assembly 43. The upper end of the cylinder and piston assembly is connected to a rod 44 (FIG. 6) which is supported by a pair of vertical bars 45 and 46. The bars 45 and 46 are attached to the rails 29 and 30.

Referring to FIG. 5, the two cutting bars 34 and 35 are formed by a single metal tube 48. Hose fittings 49 and 50 are mounted on the ends of the tube for pumping hot water through the tube. The hot water is pumped from a reservoir of hot water to one of the fittings 49 or 50, flows through the tube 48 to the other fitting, and back to the reservoir. The hot water maintains the cutter bars 34 and 35 at the desired temperature for cutting butter which is extruded from the outlet openings of the dispenser head. The preferred temperature of the cutting bars is 140° F., which allows the cutter bars to cut the butter without burning the butter.

The Vemag extruder 19 feeds a measured amount of butter to the dispensing head 23 at predetermined intervals. At the end of each interval, the Vemag extruder produces a signal which is sent to an alternating relay. The relay powers an air valve which operates the pneumatic cylinder and piston assembly 43 to pivot the cutting bars from the position illustrated in solid in FIG. 5 to the position illustrated in phantom. At the end of the next interval, the cylinder and piston assembly moves the cutting bars back to the solid position. Each time the cutting bars move across the outlet openings 25 and 26, a slug or piece of butter is cut from each extrusion of butter which flows out of the openings.

Figure 9:
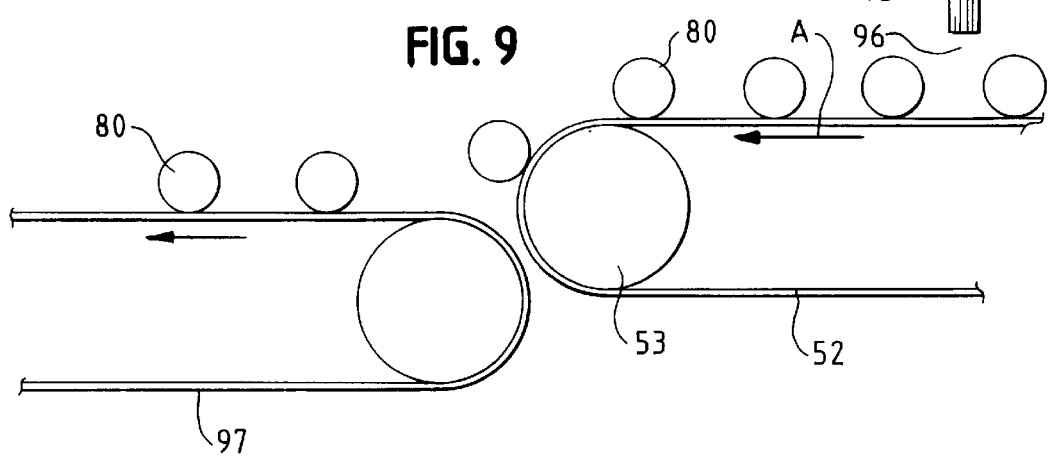
FIG. 9 is a fragmentary sectional view taken along the line 9—9 of FIG. 2 showing balls of butter being transferred from the first conveyor to a second conveyor inside the freezer tunnel.

The slugs of butter drop onto a horizontal conveyor belt 52 which is entrained around a pair of rollers 53 (FIG. 9) which are rotatably mounted on the conveyor table 32. The conveyor belt moves in the direction of the arrow A. The downstream roller 53 is driven by a belt 54 (FIG. 7) which is powered by a motor 55. The upstream roller is rotatably mounted in the conveyor table by axle 56 (FIG. 6).

A pair of elongated roller bar assemblies 58 and 59 are mounted above the conveyor belt 52. The roller bar assembly 58 is supported by a pair of vertical shafts 60 and 61 (FIGS. 6 and 7) which are rotatably mounted on the conveyor table, and the roller bar assembly 59 is supported by a pair of vertical shafts 62 and 63 which are rotatably mounted on the conveyor table. Crank arms 64–67 are fixedly connected to the rotatable shafts 60–63, respectively, and are pivotally connected to the ends of the roller bar assemblies. Pulleys 68 and 69 are connected to the lower ends of the shafts 61 and 63 and are rotated by belts 70 and 71 which are driven by motor 72. The driven pulleys 68 and 69 are connected by belts 73 and 74 to pulleys 75 and 76 which are connected to the lower ends of shafts 60 and 62.

Figure 8:
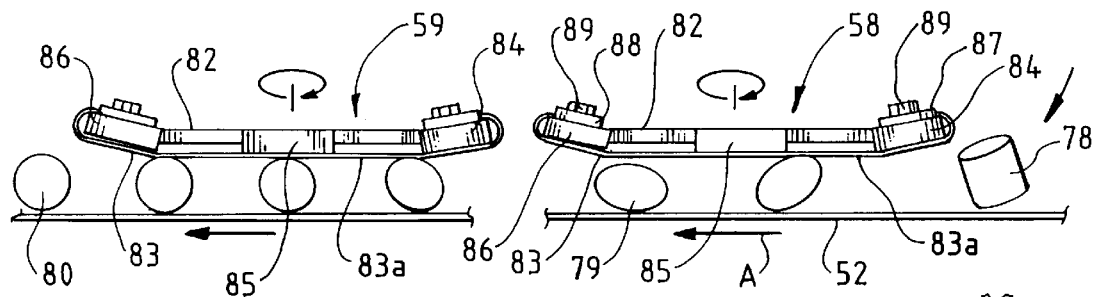
FIG. 8 is a fragmentary sectional view taken along the line 8—8 of FIG. 2 showing pieces of butter being formed into balls.

As the shafts 60–63 rotate, the crank arms 64–67 rotate each end of the roller bar assemblies in a circle so that each point on the roller bars also rotates in a circle. Referring to FIG. 8, as the conveyor belt advances the slugs 78 of butter which drop from the dispensing head, the slugs are engaged by the first roller bar assembly 58 and are rolled between the roller bar and the flat conveyor belt 52. The slugs are thereby partially formed into somewhat oval shapes 79 by the relative motion between the roller bar and the conveyor belt. The partially formed shapes 79 then engage the second roller bar assembly 59, which rolls the butter on the conveyor belt and completes the process of forming the butter into round balls 80.

Figure 7:
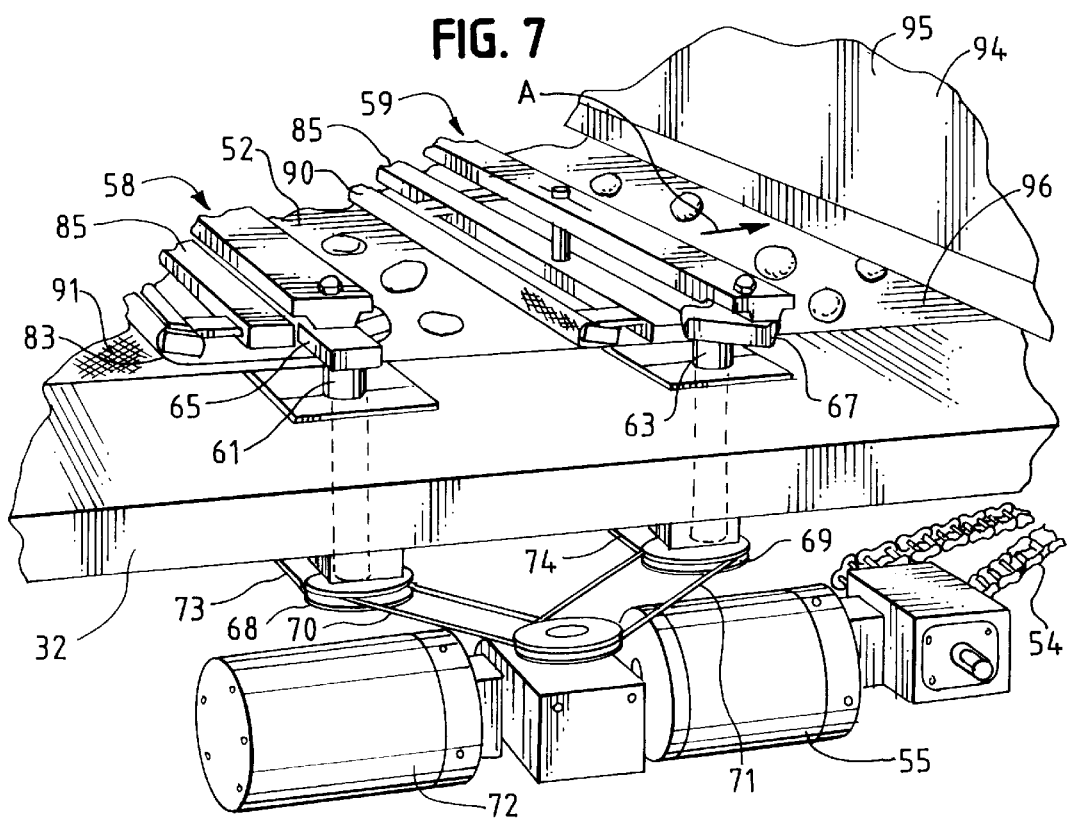
FIG. 7 is a fragmentary perspective view of the other side of the conveyor and roller bars.

Referring to FIGS. 6–8, each of the roller bar assemblies 58 and 59 includes an elongated metal frame 82 and a flexible sheet 83 which is clamped in the frame. The frame includes three elongated interconnected bars 84–86 which extend transversely across the conveyor belt. The sheet 83 is stretched across the bars 84 and 86, wrapped around the side bars 84 and 86, and clamped by clamping plates 87 and 88 which are bolted to the side bars by bolts 89. As can be seen from FIG. 8, the central portion 83a of each sheet is generally parallel to the flat and planar upper run of the conveyor belt 52. The outer edges of the side bars 84 and 86 angle upwardly to facilitate entry and exit of the butter into and out of the forming space between the parallel surfaces 83a and 52. The crank arms 64–67 rotate the central bars 85 and the central portions 83a of sheet in a plane which extends parallel to the plane of the conveyor belt.

Each sheet 83 is advantageously provided with a textured surface which is formed by crisscrossing grooves or ribs 90 (FIG. 7). Similarly, the conveyor belt 52 is also advantageously provided with a textured surface which is formed by crisscrossing grooves or ribs 91.

In the particular embodiment illustrated, the length of each crank arm was such that each end of the roller bar assemblies rotated in a four inch diameter circle, and the rotational speed of the crank arms was 126 RPM. The conveyor belt traveled at a speed of eight feet per minute. Each slug of butter weighed ½ ounce. The combination of the conveyor speed and the diameter of the rotary motion produces the desired round shape. The output of the ball-forming apparatus was approximately 23,000 per hour. The material used to make the conveyor belt 52 and the sheets 83 of the roller bar assemblies was thermoplastic belting material made by Shingle Belting of Plymouth Meeting, Pa.

The weight of the balls can be varied by adjusting the Vemag extruder to extrude more or less butter through the dispensing head before each cutting operation. The height of the roller bar assemblies above the conveyor belt can be adjusted to produce a round ball regardless of the weight of the ball.

Figure 10:
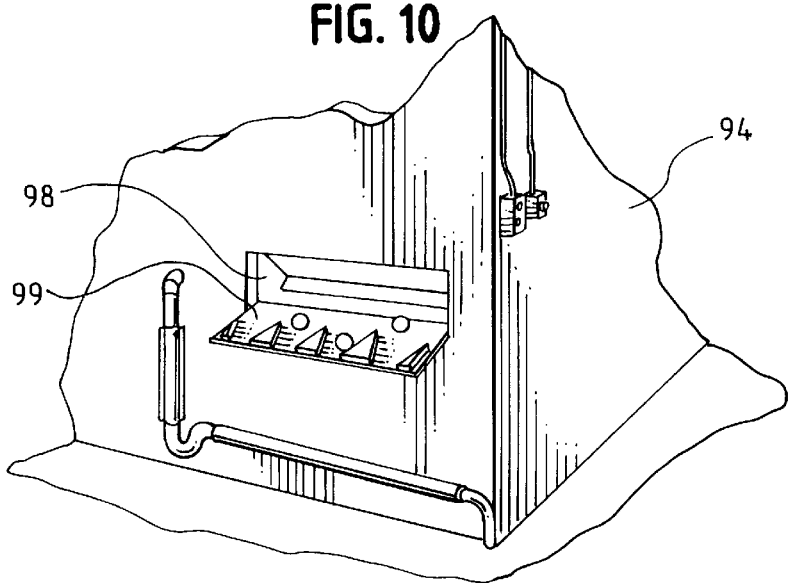
FIG. 10 is a fragmentary perspective view of the outlet opening of the freezer tunnel.

After the balls 80 are formed, they are transported by the conveyor belt 52 to a conventional I.Q.F. freeze tunnel 94 (FIGS. 1, 2, and 10). The freeze tunnel is available from Cloudy & Brittain of Mount Lake Terrace, Wash. The freeze tunnel includes a front wall 95 (FIGS. 7 and 9) having a slot 96 through which the downstream end of the conveyor belt 52 passes. The balls fall from the conveyor belt 52 to a conveyor belt 97 in the freeze tunnel. The conveyor belt 97 is a flush grid 50% open area USDA dairy approved belt made by IntraLox.

The freeze tunnel is capable of freezing 1000 pounds of butter per hour to −10° F. The conveyor belt 97 carries the frozen balls to an outlet opening 98 (FIG. 4) in the back wall of the tunnel where the balls move down an inclined slide 99 and drop into boxes 100 (FIG. 2) for packaging.

All of the parts of the conveyor table, dispenser head, and roller bar assemblies can be easily disassembled for cleaning. The metal parts are preferably made from stainless steel.

While in the foregoing specification a detailed description of specific embodiments of the invention were set forth for the purpose of illustration, it will be understood that many of the details herein given can be varied considerably by those skilled in the art without departing from the spirit and scope of the invention.

What is claimed is:

1. An apparatus for making balls of butter comprising:
    a generally planar conveyor for conveying pieces of butter along a path of movement,
    means for delivering pieces of butter to the conveyor,
    a first narrow and elongated roller bar assembly which extends across the conveyor generally perpendicular to said path of movement, at least a portion of the roller bar assembly having a surface which extends generally parallel to the conveyor,
    a second narrow and elongated roller bar assembly which extends across the conveyor generally perpendicular to said path of movement, at least a portion of the second roller bar assembly having a surface which extends generally parallel to the conveyor, the second roller bar assembly being spaced from the first roller bar assembly in a direction downstream from the first roller bar assembly along said path of movement, and
    crank means for rotating the first and second roller bar assemblies in a plane which extends generally parallel to the plane of the conveyor.

2. The apparatus of claim 1 in which said surfaces of the first and second roller bar assemblies are textured.

3. The apparatus of claim 2 in which said conveyor has a textured surface.

4. The apparatus of claim 1 in which each of said roller bar assemblies includes a frame and a flexible sheet which is attached to the frame.

5. The apparatus of claim 4 in which the flexible sheet of each of the roller bar assemblies is removably clamped to the frame of the roller bar assembly.

6. The apparatus of claim 1 in which each of the roller bar assemblies has a pair of vents and said crank means includes a rotatable shaft at each end of each of the roller bar assemblies which extends generally perpendicularly to the plane of the conveyor and a crank arm connecting each of the rotatable shafts to one of the roller bar assemblies.

7. The apparatus of claim 1 in which each of the roller bar assemblies includes a lower surface which includes a central portion which extends generally parallel to the conveyor and a pair of side portions which angle upwardly from the central portion.

8. The apparatus of claim 1 including means for freezing the balls of butter.

9. The apparatus of claim 8 in which said freezing means comprises a freeze tunnel and a second conveyor in the freeze tunnel, said first-mentioned conveyor delivering the balls of butter to the second conveyor.

10. An apparatus for making balls of butter comprising:

a generally planar conveyor for conveying pieces of butter along a path of movement;

means for delivering pieces of butter to the conveyor, and means for rolling the pieces of butter on the conveyor to form balls of butter, said delivery means comprising a dispensing head having an inlet opening and a pair of outlet openings, means for extruding butter through the outlet openings, a cutting tube mounted on the dispensing head for reciprocable movement, the cutting tube having a first portion which is reciprocable in opposite directions across one of the outlet openings and a second portion which is reciprocable in opposite directions across the other outlet opening whereby the first and second portions of the cutting tube cut butter which is extruded through the outlet openings during movement in each of said opposite directions, and means for supplying hot water to the tube.

11. The apparatus of claim 10 in which said tube is mounted on a pivot arm which is pivotally connected to the dispensing head, and means for pivoting said pivot arm.

12. The apparatus of claim 10 including means for freezing the balls of butter.

13. The apparatus of claim 12 in which said freezing means comprises a freeze tunnel and a second conveyor in the freeze tunnel, said first mentioned conveyor delivering the balls of butter to the second conveyor.

* * * * *